United States Patent
Kaupp et al.

(10) Patent No.: US 8,197,591 B2
(45) Date of Patent: Jun. 12, 2012

(54) PEARLESCENT PIGMENTS HAVING A SECONDARY COATING COMPRISING α-SILANES AND METHOD FOR THE PRODUCTION THEREOF

(75) Inventors: Günter Kaupp, Neuhaus (DE); Ulrich Schmidt, Hersbruck (DE)

(73) Assignee: Eckart GmbH (DE)

( * ) Notice: Subject to any disclaimer, the term of this patent is extended or adjusted under 35 U.S.C. 154(b) by 879 days.

(21) Appl. No.: 12/280,378

(22) PCT Filed: Feb. 23, 2007

(86) PCT No.: PCT/EP2007/001573
§ 371 (c)(1),
(2), (4) Date: Sep. 3, 2008

(87) PCT Pub. No.: WO2007/098887
PCT Pub. Date: Sep. 7, 2007

(65) Prior Publication Data
US 2009/0249979 A1    Oct. 8, 2009

(30) Foreign Application Priority Data
Feb. 24, 2006 (DE) .......................... 10 2006 009 129

(51) Int. Cl.
C09C 1/36 (2006.01)
C09C 1/00 (2006.01)
C04B 14/04 (2006.01)
C23C 16/00 (2006.01)
C23C 16/40 (2006.01)
B32B 15/02 (2006.01)
B32B 9/00 (2006.01)
B32B 19/00 (2006.01)
B32B 23/02 (2006.01)
B32B 5/16 (2006.01)
C08K 5/00 (2006.01)

(52) U.S. Cl. ........ 106/439; 106/418; 106/415; 106/417; 106/436; 106/442; 106/446; 106/447; 106/449; 106/482; 106/489; 106/490; 106/499; 428/403; 428/404; 428/405; 428/406; 427/255.18; 427/255.19

(58) Field of Classification Search .......... 106/415–417, 106/436, 439, 481–482, 418, 442, 445–447, 106/449, 490, 499; 427/255.18, 255.19; 428/403–406
See application file for complete search history.

(56) References Cited

U.S. PATENT DOCUMENTS

| 3,650,790 | A | 3/1972 | Klenke et al. ................. 106/291 |
| 4,544,415 | A | 10/1985 | Franz et al. ............... 106/288 R |
| 5,022,923 | A | 6/1991 | Rau et al. ...................... 106/415 |
| 5,223,034 | A | 6/1993 | Nitta et al. .................... 106/417 |
| 5,423,912 | A | 6/1995 | Sullivan et al. ............... 106/417 |
| 5,468,289 | A | 11/1995 | Herget et al. ................ 106/415 |
| 5,472,491 | A | 12/1995 | Duschek et al. .............. 106/418 |
| 5,759,255 | A | 6/1998 | Venturini et al. ............. 106/418 |
| 6,113,873 | A | 9/2000 | Tunashima et al. ........... 423/608 |
| 6,176,918 | B1 | 1/2001 | Glausch et al. ............... 106/415 |
| 6,488,757 | B2 | 12/2002 | Glausch ........................ 106/415 |
| 6,761,762 | B1 | 7/2004 | Greiwe et al. ................ 106/403 |
| 7,276,615 | B2 | 10/2007 | Gottschalk-Gaudig et al. .............................. 556/10 |
| 7,413,599 | B2 * | 8/2008 | Henglein et al. ............. 106/415 |
| 2004/0144023 | A1 | 7/2004 | Bruckner et al. .............. 47/29.4 |
| 2006/0042509 | A1 * | 3/2006 | Henglein et al. ............. 106/415 |

FOREIGN PATENT DOCUMENTS

| DE | 2 106 613 | 8/1971 |
| DE | 35 35 818 | 4/1987 |
| DE | 42 07 723 | 9/1993 |
| DE | 196 18 569 | 11/1997 |
| DE | 196 39 783 | 4/1998 |

(Continued)

OTHER PUBLICATIONS

International Search Report and Written Opinion mailed Aug. 28, 2007 in corresponding PCT International Application No. PCT/EP2007/001573.

(Continued)

*Primary Examiner* — Anthony J Green
*Assistant Examiner* — Pegah Parvini
(74) *Attorney, Agent, or Firm* — Ostrolenk Faber LLP

(57) ABSTRACT

The invention relates to a pearlescent pigment comprising a metal oxide-containing, platelet-shaped substrate and having a first and a second protective layer, wherein the metal oxide has a refractive index greater than 1.8, and in which the first protective layer comprises cerium oxide and/or hydrated cerium oxide and/or cerium hydroxide, the second protective layer consists substantially, preferably completely, of $SiO_2$, wherein the second protective layer is disposed on top of the first protective layer, and between the first and second protective layers there can be disposed metal oxide layers which differ from cerium oxide and/or hydrated cerium oxide and/or cerium hydroxide and $SiO_2$, wherein the second protective layer has an organochemical aftercoat and the organochemical aftercoat comprises at least one silane bonded to the second protective layer by means of at least one oxygen atom, said α-silane having the formula

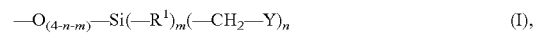

$$-O_{(4-n-m)}-Si(-R^1)_m(-CH_2-Y)_n \qquad (I),$$

in which $1 \leq n+m \leq 3$; $m=0$ to 2; $n=1$ to 3 and $R^1$ is a hydrogen atom or an Si—C-bonded $C_1$-$C_{20}$-hydrocarbon radical or a $C_1$-$C_{15}$-hydrocarbonoxy radical, in which in each case one or more methylene units not adjacent to one another can be replaced by the groups —O—, —CO—, —COO—, —OCO—, or —OCOO—, —S—, or —$NR^x$— and in which one or more methine units not adjacent to one another can be replaced by the groups —N=, —N=N—, or —P=, wherein $R^1$ can independently be the same or different, $R^x$ can be a hydrogen atom or a linear, branched and/or cyclic $C_1$-$C_{15}$-hydrocarbon radical or aryl radical, and Y is a functional binding group reactive with a binder system.

31 Claims, No Drawings

FOREIGN PATENT DOCUMENTS

| | | |
|---|---|---|
| DE | 103 19 937 | 12/2004 |
| EP | 0 141 174 | 5/1985 |
| EP | 0 342 533 | 4/1993 |
| EP | 0 632 109 | 1/1995 |
| EP | 0 870 730 | 10/1998 |
| EP | 0 649 886 | 8/1999 |
| EP | 1 203 795 | 5/2002 |
| EP | 1 084 198 | 7/2002 |
| WO | WO 98/13426 | 4/1998 |
| WO | WO 2004/092284 | 10/2004 |
| WO | WO 2004/104109 | 12/2004 |
| WO | WO 2005/075579 | 8/2005 |
| WO | WO 2006/021386 | 3/2006 |

OTHER PUBLICATIONS

J. Pfeiffer and V. Stanjek, "Less is more—and faster," Farbe and Lack 111, 2005(11), pp. 38-43, (in German and English translation).

* cited by examiner

PEARLESCENT PIGMENTS HAVING A SECONDARY COATING COMPRISING α-SILANES AND METHOD FOR THE PRODUCTION THEREOF

CROSS REFERENCE TO RELATED APPLICATIONS

The present application is a 35 U.S.C. §371 National Phase conversion of PCT/EP2007/001573, filed Feb. 23, 2007, which claims benefit of German Application No. 10 2006 009 129.9, filed Feb. 24, 2006, the disclosure of which is incorporated herein by reference. The PCT International Application was published in the German language.

TECHNICAL FIELD

The invention relates generally to pearlescent pigments and, more particularly, to weather-stable pearlescent pigments with an aftercoat containing α-silanes and to processes for their production.

BACKGROUND OF THE INVENTION

Pearlescent pigments which contain titanium dioxide in the top coat or which are composed of particulate $TiO_2$ have a certain photocatalytic activity. If UV radiation then acts on a pearlescent pigment in the presence of water and oxygen, the UV activity of the pearlescent pigment can induce an accelerated breakdown of organic compounds, e.g. of a binder matrix. Even the proportion of UV contained in daylight can bring about this reaction. That is to say, for applications such as automobile lacquers, which are directly exposed to weathering, specially stabilized pearlescent pigments must be employed. In order to counteract this photocatalytic effect, which is deleterious to external applications, pearlescent pigments can be provided with various protective coatings for decreasing the photoactivity. These protective coatings often contain oxides of the elements cerium and/or zirconium, which have proven to be particularly effective.

In order to make thus stabilized pearlescent pigments compatible with the respective binder for application, in particular, in water-based pigmented coating systems, these pigments are provided with an organic aftercoat. This binds, on the one hand, to the surface of the pearlescent pigment and, on the other hand, to the binder. By this means, good condensation water resistance and good rheological properties, for example good dispensability, are obtained in the coating system. Moreover, by means of the organic aftercoat it is possible to positively influence the orientation behavior of the pearlescent pigments in the application medium and thus also their optical properties.

In EP 0 141 174, pearlescent pigments with improved weathering resistance are described, which have a protective coating which essentially consists of a rare earth metal compound—e.g. cerium—and a polysiloxane. Moreover, zinc or aluminum salts or alternatively silicate can be present in the protective coating, which is prepared in an aqueous suspension. The coating operation is carried out in aqueous suspension and the product is dried following isolation thereof.

EP 0 342 533 discloses pigments coated with zirconium oxide, to which a layer consisting of a hydrated metal oxide of the elements cobalt, manganese or cerium can be applied. Although the pigment treated in this way should now be readily employable in nonaqueous lacquer systems, it is, however, still unsuitable for water-dilutable pigmented coating systems according to EP 632 109, as in this case the formation of microfine bubbles is caused in the coated film.

According to the teaching of EP 0 632 109, a three-layer protective coat is applied to a platelet-shaped substrate coated with metal oxides. In a first stage, $SiO_2$, in a second stage a hydroxide or hydrated oxide of cerium, aluminum or zirconium, and in a third stage at least one hydroxide or hydrated oxide of cerium, aluminum or zirconium and an organic coupling agent are applied. Moreover, the coupling agents must be hydrolyzed before binding to the pigment surface, and according to the teaching of WO 98/13426 only a maximum of 60% of the added coupling agents can be bound to the pigment surface.

WO 98/13426 discloses modified pearlescent pigments based on a platelet-shaped substrate coated with metal oxides. According to the teaching of WO 98/13426, the top coat consists of at least two oxides, oxide mixtures or mixed oxides of silica, alumina, cerium oxide, titanium oxide, or zirconium oxide and a water-based oligomeric silane system. The water-based oligomeric silane system is partially hydrophobized by alkyl radicals containing not more than eight carbon atoms. Nevertheless, the predominant proportion of the aftercoat is of a hydrophilic nature. Reading contrary to the disclosure, the pigments still have a certain swelling behavior in the condensation water climate test.

Furthermore, no investigations on the influence of the order of the oxide protective layers as regards their effectiveness in improving the UV stability of the pearlescent pigments are disclosed. Therefore an optimum protective layer architecture is also not described.

EP 0 649 886 relates to pearlescent pigments with a titanium dioxide or iron oxide coating, which are aftercoated in aqueous phase with a combination of hydrated cerium and aluminum oxides and subsequently dried.

According to the teaching of EP 1 203 795, a pearlescent pigment can have a layer system comprising hydrated oxides of silicone or aluminum in a first layer and hydrated oxides of silicone, aluminum, zirconium, or cerium in a subsequent second layer, wherein the composition of the first layer differs from that of the second layer. The pearlescent pigment further has a third layer comprising at least one organic hydrophobic coupling agent, wherein the organic hydrophobic coupling agent does not react with the binder of, say, a pigmented coating system. Contrary to the disclosure of this specification, the pigments do not show good adhesion in the condensation water climate test, as the hydrophobic coupling agents do not have suitable groups for binding to the coating system.

In most of the processes used in the prior art, $SiO_2$ and/or alumina is applied as a first layer. A cerium oxide layer is usually applied subsequently thereto or together with further components as a mixed oxide deposition by precipitation. Binding of the silanes then generally takes place in a mixed precipitation with precipitation of the metal hydroxides in aqueous solution. On account of the mixed precipitation of the hydroxides and of the silane system, the effectiveness of surface coating with the oligomeric silane system is low. Consequently, excessively large amounts of the expensive silanes are employed, which unnecessarily increases the raw material costs.

In EP 1 084 198 B1, effect pigments are described which on account of their surface modification with reactive orientation agents show very good adhesion to the basecoat. However, viewed against this background, EP 1 084 198 B1 does not disclose any weather-stable pearlescent pigments.

In DE 103 19 937 A1, organofunctional surface-coated metal oxides are described. The metal oxides are surface-modified with α-silanes. However, pearlescent pigments and the requirements associated therewith are not mentioned in any way.

SUMMARY OF THE INVENTION

It is an object of the invention to provide metal oxide-containing pearlescent pigments having a layer system of simple architecture and having generally improved weather stability compared with the prior art. The protective layer system should in particular afford effective protection against any photocatalytic activity of the pigment induced by UV light, without substantially adversely affecting the optical properties of the pigment such as luster. It is moreover desired that the metal oxide-containing pearlescent effect pigments have good application properties, particular as measured in the condensation water climate test.

The mode of action of this protective layer system should show improvements over the prior art. Furthermore, the pearlescent pigments of the invention are desirably provided with an organochemical aftercoat, which makes for very good orientation behavior of the pearlescent pigments in the coating and at the same time for outstanding binding (very good adhesion) to the binder. The pigments are required to score better in the condensation water climate test and, in particular, to show improvements in terms of the criteria adhesion, degree of swell, degree of bubble formation and the DOI in the basecoat/clearcoat system.

The object is achieved by provision of a pearlescent pigment comprising a metal oxide-containing platelet-shaped substrate and having a first and a second protective layer, wherein the metal oxide has a refractive index greater than 1.8, and in which
a) the first protective layer comprises cerium oxide and/or hydrated cerium oxide and/or cerium hydroxide,
b) the second protective layer consists substantially, preferably entirely, of $SiO_2$, wherein the second protective layer is disposed on top of the first protective layer, and between the first and second protective layers there can be disposed metal oxide layers which differ from cerium oxide and/or hydrated cerium oxide and/or cerium hydroxide and $SiO_2$, wherein
c) the second protective layer has an organochemical aftercoat and the organochemical aftercoat comprises at least one α-silane bonded to the second protective layer by means of at least one oxygen atom, said α-silane having the formula

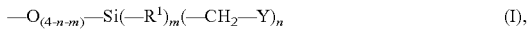

wherein $1 \leq n+m \leq 3$; $m=0$ to 2; $n=1$ to 3 and
$R^1$ is a hydrogen atom or an Si—C-bonded-$C_1$-$C_{20}$-hydrocarbon radical or a $C_1$-$C_{15}$-hydrocarbonoxy radical, in which in each case one or more methylene units not adjacent to one another can be replaced by the groups —O—, —CO—, —COO—, —OCO—, or —OCOO—, —S—, or —NR$^x$— and in which one or more methine units not adjacent to one another can be replaced by the groups —N=, —N=N—, or —P=, wherein $R^1$ can independently be the same or different,
$R^x$ can be a hydrogen atom or a linear, branched and/or cyclic $C_1$-$C_{15}$-hydrocarbon radical or aryl radical, and
Y is a functional binding group reactive with a binder system.

The object is further achieved by a process for the preparation of a pearlescent pigment as defined in any one of Claims 1 to 24, which comprises the following steps:
(a) suspending a metal oxide-containing, platelet-shaped substrate in a liquid phase, wherein the metal oxide has a refractive index greater than 1.8,
(b) applying a layer of cerium oxide and/or hydrated cerium oxide and/or cerium hydroxide to the platelet-shaped substrate,
(c) optionally applying one or more metal oxide layers to the pigment coated in step (b),
(d) applying a layer consisting substantially, preferably entirely, of $SiO_2$ to the pigment coated in step (b) or step (c),
(e) coating the pigment obtained in step d) with an organochemical aftercoat comprising at least one α-silane of the formula

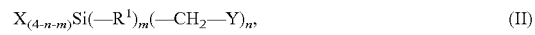

In which $1 \leq n+m \leq 3$; $m=0$ to 2; $n=1$ to 3 and
$R^1$ is a hydrogen atom or an Si—C-bonded $C_1$-$C_{20}$-hydrocarbon radical or a $C_1$-$C_{15}$-hydrocarbonoxy radical, in which in each case one or more methylene units not adjacent to one another can be replaced by the groups —O—, —CO—, —COO—, —OCO—, or —OCOO—, —S—, or —NR$^x$— in which one or more methine units not adjacent to one another can be replaced by the groups —N=, —N=N—, or P=, wherein $R^1$ can independently be the same or different,
$R^x$ is a hydrogen atom or a linear, branched and/or cyclic $C_1$-$C_{15}$-hydrocarbon radical or aryl radical, wherein $R^x$ can be the same or different and
X is a hydrolyzable and condensable group which is selected from the group consisting of alkoxy groups, hydroxyl groups, acetyloxy groups, halogen radicals, and mixtures thereof, and
Y is a functional binding group reactive with a binder system.

Preferred developments of the effect pigment of the invention and of the process of the invention are defined in the relevant subclaims.

According to the invention, the second protective layer consists substantially of $SiO_2$. Preferably, the second protective layer consists entirely of $SiO_2$. For the purposes of the invention, a protective layer consisting substantially of $SiO_2$ is understood as meaning that the protective layer consists to an extent of at least 80% by weight, more preferably to an extent of at least 90% by weight and even more preferably to an extent of at least 95% by weight of $SiO_2$. Very preferably, this protective layer consists to an extent of at least 98% by weight of $SiO_2$. The percentages by weight relate here to the total weight of the $SiO_2$-containing protective layer.

DETAILED DESCRIPTION OF CERTAIN EMBODIMENTS OF THE INVENTION

Surprisingly, the weather-stable pearlescent pigments of the invention having an organochemical aftercoat comprising at least one α-silane of the formula —O$_{(4-n-m)}$—Si(—R$^1$)$_m$—(CH$_2$—Y)$_n$, show better adhesion when stressed with condensation water (using the cross cutting test as specified in DIN EN ISO 2409) in a binder system of, say, a lacquer, such that when for example a lacquer is tested in the condensation water climate test, a markedly improved stability is found. Moreover, it has been shown that the distinctness of image (DOI) is also improved.

The organochemical aftercoats of weather-stable pearlescent pigments known in the prior art also use, inter alia, organofunctional silanes. These organofunctional silanes are either alkylsilanes or functional γ-silanes, in which the functional group is bonded to the Si atom via a $C_3H_8$ spacer (propylene). If, instead of the conventional γ-silanes, α-silanes of the formula (I) are used, surprisingly advantageous properties are obtained in the condensation water climate test as specified in DIN 50 017. In particular, the swelling behavior as specified in DIN 53230 and the DOI (distinctness of image) show improvements over the prior art.

The silanes used according to the invention are so-called α-silanes. It is known of these silanes that they have properties different from the conventional γ-silanes (see e.g. J. Pfeiffer, and V. Stanjek, *farbe+lack* 111, 2005(11), pp. 38 to 43). Thus, in particular, the hydrolysis and condensation reactions are accelerated compared with the comparable γ-silanes.

The radical $R^1$ of the formula (I) is a hydrogen atom or an Si—C-bonded $C_1$-$C_{20}$-hydrocarbon radical or a $C_1$-$C_{15}$-hydrocarbonoxy radical, in which, in each case, one or more methylene units not adjacent to one another can be replaced by the groups —O—, —CO—, —COO—, —OCO—, or —OCOO—, —S—, or —$NR^x$— and in which one or more methine units not adjacent to one another can be replaced by the groups —N, —N=N—, or P=, wherein $R^1$ can be the same or different.

Preferably, $R^1$ is an unsubstituted $C_1$-$C_{15}$-hydrocarbon radical, more preferably an unsubstituted $C_1$-$C_8$-hydrocarbon radical and very preferably an unsubstituted $C_1$-$C_3$-hydrocarbon radical or an acetyl radical. Most preferably, $R^1$ is an ethyl or a methyl group. Such α-silanes have additional hydrophobic properties due to this hydrocarbon radical, and the hydrophobicity decreases with decreasing chain length of $R^1$.

According to a further preferred variant, the Si—C-bonded $C_1$-$C_{20}$-hydrocarbon radical $R^1$ is substituted by at least one functional binding group reactive with a binder system, which reactive functional binding group is selected from the group consisting of —CN, —NCO, —$NR^x{}_2$, —COOH, —$COOR^x$, -acryloyl, -methacryloyl, -epoxy, ureido, —SH, —OH, —$CONR^x{}_2$, and mixtures thereof.

In other preferred embodiments, n=1 and m=0 in formula (I) such that the α-silane contains no organic radical $R^1$.

The functional group Y has sufficient chemical reactivity to be able to form a chemical bond with the binder of the application medium or with a polymer component of a polymer. The functional group Y is selected depending on the binder in the application medium, for example in a pigmented coating system or dye or polymer. If, in the α-silane of formula (I), n is equal to 2 or 3, then the two or three functional groups Y can be identical to, or different from, one another. Y can be, for example, a —CN, —NCO, —$NR^x{}_2$, —$CHNR^x{}_2$, $CH_2$—$NR^x$, morpholino, —COOH, —$COOR^x$, —OC(O)C(R)=$CH_2$, -epoxy, preferably glycidoxy, —C(O)—NH—C(O)—$NR^x{}_2$, —SH, or —OH group or a mixture thereof.

$R^x$ can be, for example, a hydrogen atom or a linear, branched and/or cyclic $C_1$-$C_{15}$-hydrocarbon or aryl radical, wherein $R^x$, if several Rx are present on an α-silane of formula (I), can be the same or different.

Preferably, Y is an —$NR^x{}_2$, —$CHNR^x{}_2$, —$CH_2$—$NR^x$, —$CHNH_2$ or —$CH_2$—$NH_2$ group, wherein $R^x$ can independently be a hydrogen atom or a linear or branched and/or cyclic alkyl radical or an aryl radical containing from 4 to 12 carbon atoms, preferably containing from 5 to 8 carbon atoms. In the case of cycloalkyl radicals, in the variant Y=—$NR^x{}_2$ the two $R^x$ radicals can denote a cycloalkyl radical, which includes the N-atom, preferably symmetrically, to give a corresponding heterocyclic ring (e.g. $C_5H_{10}N$—=piperidyl). The cycloalkyl radicals may also contain further heteroatoms such as oxygen and/or sulfur. More preferably, $R^x$ stands for relatively hydrophobic radicals, such as, for example, a phenyl, morpholino or cyclohexyl radical. By means of such functions, the silane and thus also the surface of the pearlescent pigments of the invention are imparted with relatively hydrophobic properties, but at the same time maintain, on account of the amino adhesive group, good binding properties to the binder.

According to formula (I), the α-silane can have (4−n−m) oxygen atoms, wherein at least one of these oxygen atoms enters into a bond, preferably a covalent bond, with the $SiO_2$ surface of the pearlescent pigment. When (4−n−m) is equal to 2 or 3, the other oxygen atoms can either also bind to the pearlescent surface or alternatively form bonds between adjacent silanes by condensing with one another. It is furthermore possible for these oxygen atoms to additionally form part of an uncondensed hydroxyl group or an unhydrolyzed alkoxy group.

Suitable α-silanes of the formula (I) are commercially available from Wacker, Burghausen, Germany under the trade name Geniosil and their corresponding trade numbers.

Examples thereof are:
aminomethyldimethylmethoxysilane,
aminomethylmethyldimethoxysilane,
aminomethyltrimethoxysilane,
N-methylaminomethyldimethylmethoxysilane,
N-methylaminomethylmethyldimethoxysilane,
N-methylaminomethyltrimethoxysilane,
N-ethylaminomethyldimethylmethoxysilane,
N-ethylaminomethylmethyldimethoxysilane,
N-ethylaminomethyltrimethoxysilane,
N-cyclohexylaminomethyltrimethoxysilane,
N-cyclohexylaminomethylmethyldimethoxysilane,
N-phenylaminotrimethoxysilane,
N-phenylaminomethyltrimethoxysilane,
N,N-dimethylaminomethyldimethylmethoxysilane,
N,N-dimethylaminomethylmethyldimethoxysilane,
N,N-dimethylaminomethyltrimethoxysilane,
N,N-diethylaminomethyldimethylmethoxysilane,
N,N-diethylaminomethylmethyldimethoxysilane,
N,N-diethylaminomethyltrimethoxysilane,
N,N-dipropylaminomethyldimethylmethoxysilane
N,N-dipropylaminomethylmethyltrimethoxysilane,
N,N-dipropylaminomethyltrimethoxysilane,
N,N-methylethylaminomethyldimethylmethoxysilane,
N,N-methylethylaminomethylmethyldimethoxysilane,
N,N-methylethylaminomethyltrimethoxysilane,
anilinomethyldimethylmethoxysilane,
anilinomethylmethyldimethoxysilane,
anilinomethyltrimethoxysilane,
morpholinomethyldimethylmethoxysilane,
morpholinomethylmethyldimethoxysilane,
morpholinomethyltrimethoxysilane,
N,N, N-trimethylammoniummethyldimethylmethoxysilane,
N,N, N-trimethylammoniummethylmethyldimethoxysilane,
N,N, N-trimethylammoniummethyltrimethoxysilane,
N,N, N-triethylammoniummethyldimethylmethoxysilane,
N,N, N-triethylammoniummethylmethyldimethoxysilane,
N,N, N-triethylammoniummethyltrimethoxysilane,
acryloxymethyldimethylmethoxysilane,
acryloxymethylmethyldimethoxysilane,
acryloxymethyltrimethoxysilane,
methacryloxymethyldimethylmethoxysilane,
methacryloxymethylmethyldimethoxysilane,
methacryloxymethyltrimethoxysilane,
isocyanatomethyldimethylmethoxysilane,
isocyanatomethylmethyldimethoxysilane,
isocyanatomethyltrimethoxysilane,
methylcarbamatomethyldimethylmethoxysilane,
mercaptomethyltrimethoxysilane,
glycidoxymethyldimethylmethoxysilane,
glycidoxymethylmethyldimethoxysilane, glycidoxymethyltrimethoxysilane,
aminomethyldimethylethoxysilane,
aminomethylmethyldiethoxysilane,
aminomethyltriethoxysilane,
N-methylaminomethyldimethylethoxysilane,
N-methylaminomethylmethyldiethoxysilane,
N-methylaminomethyltriethoxysilane,
N-ethylaminomethyldimethylethoxysilane,
N-ethylaminomethylmethyldiethoxysilane,
N-ethylaminomethyltriethoxysilane,
N-cyclohexylaminomethyltriethoxysilane,
N-cyclohexylaminomethylmethyldiethoxysilane,
N-phenylaminotriethoxysilane,
N-phenylaminomethyltriethoxysilane,
N,N-dimethylaminomethyldimethylethoxysilane
N,N-dimethylaminomethylmethyldiethoxysilane,
N,N-dimethylaminomethyltriethoxysilane,
N,N-diethylaminomethyldimethylethoxysilane
N,N-diethylaminomethylmethyldiethoxysilane
N,N-diethylaminomethyltriethoxysilane,
N,N-dipropylaminomethyldimethylethoxysilane,
N,N-dipropylaminomethylmethyltriethoxysilane,
N,N-dipropylaminomethyltriethoxysilane,
N,N-methylethylaminomethyldimethylethoxysilane.
N,N-methylethylaminomethylmethyldiethoxysilane,
N,N-methylethylaminomethyltriethoxysilane,
anilinomethyldimethylethoxysilane,
anilinomethylmethyldiethoxysilane,
anilinomethyltriethoxysilane,
morpholinomethyldimethylethoxysilane,
morpholinomethylmethyldiethoxysilane,
morpholinomethyltriethoxysilane,
N,N,N-trimethylammoniummethyldimethylethoxysilane,
N,N,N-trimethylammoniummethylmethyldiethoxysilane,
N,N,N-trimethylammoniummethyltriethoxysilane,
N,N,N-triethylammoniummethyldimethylethoxysilane,
N,N,N-triethylammoniummethylmethyldiethoxysilane,
N,N,N-triethylammoniummethyltriethoxysilane,
acryloxymethyldimethylethoxysilane,
acryloxymethylmethyldiethoxysilane,
acryloxymethyltriethoxysilane,
methacryloxymethyldimethylethoxysilane,
methacryloxymethylmethyldiethoxysilane,
methacryloxymethyltriethoxysilane,
isocyanatomethyldimethylethoxysilane,
isocyanatomethylmethyldiethoxysilane,
isocyanatomethyltriethoxysilane,
methylcarbamatomethyldimethylethoxysilane,
methylcarbamatomethylmethyldiethoxysilane,
methylcarbamatomethyltriethoxysilane,
mercaptomethyldimethylethoxysilane,
mercaptomethylmethyldiethoxysilane,
mercaptomethyltriethoxysilane,
glycidoxymethyldimethylethoxysilane
glycidoxymethylmethyldiethoxysilane and
glycidoxymethyltriethoxysilane, or mixtures thereof.

In a preferred embodiment, the organochemical aftercoat consists of one or more α-silanes differing from one another and having the formula (I)

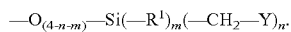

In preferred embodiments, in formula (I), n=1 and m=1. Furthermore, it is preferred that the radical $R^1$ be an unsubstituted $C_1$-$C_3$-hydrocarbon radical, more preferably a methyl group. According to a further preferred variant, n=1 and m=0.

According to a further variant of the present invention, the organochemical aftercoat contains no silane not having a functional binding group Y and not having functional binding groups in $R^1$. It has been shown, surprisingly, that the application properties in the condensation water climate test and the distinctness of image (DOI) of the metal oxide-containing pearlescent pigments of the invention can be still further improved if no silanes not having a functional binding group, that is, for example, no alkylsilanes, are present in the organochemical aftercoat.

In a further embodiment, the organochemical aftercoat of the pearlescent pigment of the invention additionally comprises at least one γ-silane of formula (III)

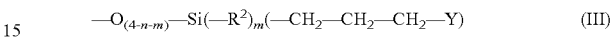

in which $1 \leq n+m \leq 3$; m=0 to 2; n=1 to 3 and
$R^2$ is a hydrogen atom or an Si—C-bound $C_1$-$C_{20}$-hydrocarbon radical or a $C_1$-$C_{15}$-hydrocarbonoxyrest, in which in each case one or more methylene units not adjacent to one another can be replaced by the groups —O—, —CO—, —COO—, —OCO—, or —OCOO—, —S—, or —$NR^x$— and in which one or more methine units not adjacent to one another can be replaced by the groups —N—, —N═N—, or P═, wherein $R^2$ can independently be the same or different, and $R^x$ is a hydrogen atom or a linear, branched and/or cyclic $C_1$-$C_{15}$-hydrocarbon or aryl radical and Y is a binding group functional with a binder system or a polymer component.

The group $R^2$ is preferably an Si—C-bonded $C_1$-$C_{15}$-hydrocarbon radical, more preferably a $C_1$-$C_3$-hydrocarbon radical and most preferably methyl or ethyl.

It has been found, surprisingly, that the simultaneous use of α-silane(s) and γ-silane(s) also improves the application properties such as condensation resistance and distinctness of image (DOI).

According to a further preferred embodiment of the invention, the Si—C-bonded $C_1$-$C_{20}$-hydrocarbon radical $R^2$ is substituted by at least one functional binding group reactive with a binder system, wherein the reactive functional binding group is selected from the group consisting of —CN, —NCO, —$NR^x_2$, —COOH, —$COOR^x$, -acryloyl, -methacryloyl, -epoxy, —SH, —OH, ureido, —$CONR^x_2$, and mixtures thereof.

The functional binding group Y reactive with a binder system or a polymer component is preferably selected from the group consisting of acrylate, methacrylate, vinyl, amino, γ-(2-aminoethyl)amino, cyanate, isocyanate, epoxy, hydroxyl, thiol, ureido and carboxyl groups, and mixtures thereof.

Preferably, in formula (III), n=1 and m=1. In a particularly preferred embodiment, in formula (III), n=1 and m=0.

Such γ-silanes are commercially available and are produced, for example, by Degussa, Rheinfelden, Germany, and marketed under the trade name under the name "Dynasylan®". Further products can be obtained from OSi Specialties (Silquest® silanes) or from Wacker (standard γ-silanes in the GENIOSIL® group of products).

Examples of these are 3-methacryloxypropyltrimethoxysilane (Dynasylan MEMO, Silquest A-174NT), vinyl-tri(m)ethoxysilane (Dynasylan VTMO or VTEO, Silquest A-151 or A-171), 3-mercaptopropyltri(m)ethoxysilane (Dynasylan MTMO or 3201; Silquest A-189), 3-glycidoxypropyltrimethoxysilane (Dynasylan GLYMO, Silquest A-187), tris(3-trimethoxysilylpropyl)isocyanurate (Silquest Y-11597), gamma-mercaptopropyltrimethoxysilane (Silquest A-189), bis(3-triethoxysilylpropyl)polysulfide (Silquest A-1289), gamma-isocyanatopropyltrimethoxysilane (Silquest A-Link 35, GENIOSIL GF40), and 3-(triethoxysilyl)propylsuccinic anhydride (GENIOSIL GF 20).

In a particularly preferred embodiment, the organofunctional silane mixture modifying the SiO$_2$ layer contains, in addition to at least one α-silane, at least one aminofunctional γ-silane. The amino function is a functional group which can chemically interact or react with the usual groups present in binders in, say, pigmented coating systems or paints in a variety of ways. This can include a covalent bond with, for example, isocyanate or carboxylate functions of the binder, or hydrogen bonds with, say, OH or COOR functions, or alternatively ionic interactions. An amino-functional γ-silane is therefore very highly suitable for the purpose of chemically binding the effect pigment to various binders.

Preferably, the following compounds are used for this purpose: aminopropyltrimethoxysilane (Dynasylan AMMO; Silquest A-1110), aminopropyltriethoxysilane (Dynasylan AMEO) or N-(2-aminoethyl)-3-aminopropyltrimethoxysilane (Dynasylan DAMO, Silquest A-1120) or N-(2-aminoethyl)-3-aminopropyltriethoxysilane, bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), and mixtures thereof.

In another particularly preferred embodiment, the organochemical aftercoat comprises one or more α-silanes of the formula

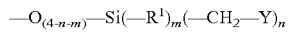

and one or more γ-silanes of the formula

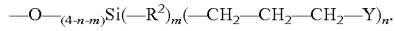

Very preferably, the organochemical aftercoat consists of the above-mentioned α-silanes and γ-silanes.

The mixing ratio of α-silane(s) to γ-silane(s) is preferably from 1:10 to 10:1 mol % and more preferably from 1:5 to 5:1 mol % and very preferably from 1:3 to 3:1 mol %.

In further preferred embodiments, the organochemical aftercoat comprises one or more silanes of the formula

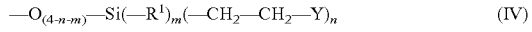 (IV)

and/or one or more silanes of the formula

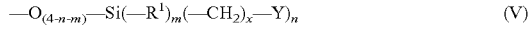 (V)

Here, x is a natural number in the range 3<x<20.
and Y, R$^1$, m and n have the meanings or valences stated above.

The proportion of the organochemical aftercoat is preferably between 0.1% and 6%, by weight, preferably between 0.2% and 5%, by weight, in each case based on the total weight of the pigment. The proportion of the at least one α-silane is preferably between 0.1% and 5%, by weight and preferably between 0.3% and 3%, by weight, in each case based on the total weight of the pigment.

It has now been found, surprisingly, that excellent UV and weather stabilities of pearlescent pigments are achieved by a pearlescent pigment comprising a metal oxide-containing, platelet-shaped substrate, onto which a first protective layer, comprising a layer comprising or consisting of cerium oxide and/or hydrated cerium oxide and/or cerium hydroxide, has been applied, preferably directly, and to which a further layer of SiO$_2$ has been subsequently applied which possesses an organochemical aftercoat. Thus, in one embodiment of the pearlescent pigment according to the invention the first protective layer, in addition to a metal oxide selected from the group consisting of cerium oxide, hydrated cerium oxide, cerium hydroxide and mixtures thereof, also contains SiO$_1$.

Despite the low refractive index of SiO$_2$, the pigments surprisingly have a very good luster. It has further been shown, surprisingly, that even thin layer thicknesses of SiO$_2$ are adequate for high UV stability. This would not have been expected in view of the comments in DE 4207723 A1, p. 2, lines 19 to 21: "Pigments coated with silicate or with Al$_2$O$_3$ are poorly dispersible and additionally show losses of luster in printing inks and coats of paint".

The amount of cerium employed, particularly in the form of cerium oxide and/or hydrated cerium oxide and/or cerium hydroxide, is preferably between 0.05% and 3.0%, by weight, more preferably between 0.1% and 1.0%, by weight and most preferably between 0.2% and 0.7%, by weight, in each case based on the total weight of the pigment. The proportion by weight should preferably not be more than 1.0% by weight, based on the amount of pigment employed, as otherwise losses in the optical quality of the pigments might be too severe. On the other hand, a proportion by weight of less than 0.1% by weight will generally not provide adequate additional UV stabilization.

In individual cases, the proportion by weight can depend on the fineness and, concomitantly, on the specific surface area of the pearlescent pigment and on the layer thickness of the TiO$_2$ layer. Fine pigments and thicker TiO$_2$ layers can also demand a higher content of cerium oxide and/or cerium hydroxide and/or hydrated cerium oxide.

The SiO$_2$ content of the pearlescent pigments of the invention is preferably from 0.5% to 8%, by weight of the pigment, more preferably from 0.6% to 7%, by weight, even more preferably from 0.6% to 5%, by weight and most preferably from 0.8% to 2%, by weight, in each case based on the total weight of the pigment. Here again, in each individual case the amount of SiO$_2$ can depend on the fineness and, concomitantly, on the specific surface area of the pearlescent pigment and on the layer thickness of the TiO$_2$ layer. Fine pigments and thicker TiO$_2$ layers can likewise demand a higher SiO$_2$ content. Above 8% by weight of SiO$_2$, in general no further improvement in the weather and UV stabilities is observed in any way. Often, the properties might even worsen, presumably because the thicker protective layers are brittle and/or friable and cracks result more readily, such that the photoactivity of the coated TiO$_2$ is no longer suppressed to a sufficient degree. Below 0.5% by weight, the protective action of the SiO$_2$ layer can be too low.

In addition to SiO$_2$, there may also be present hydroxides, suboxides and/or hydrated oxides of silicone in the SiO$_2$ layer.

It is thought that the better weather and UV resistances of the pearlescent pigments of the invention are to be attributed, inter alia, to the optimum layer order of the two oxides. Cerium oxide and/or hydrated cerium oxide and/or cerium hydroxide are known per se as very effective agents for the suppression of the photochemical activity of TiO$_2$. The activity is presumably based, in particular, on the known Ce(III)/Ce(IV) redox system. This makes it possible for free radicals, which on account of the photochemical activity of TiO$_2$ are generated on its surface, to react effectively. Obviously, this reaction is particularly effective if cerium oxide and/or hydrated cerium oxide and/or cerium hydroxide have already been deposited as a first layer in direct contact with the TiO$_2$ surface of the starting pigment.

In the present invention, it is therefore preferred to apply the cerium oxide and/or hydrated cerium oxide and/or cerium hydroxide layer directly to the TiO$_2$ layer. The cerium oxide and/or hydrated cerium oxide and/or cerium hydroxide layer, however, must not necessarily be applied directly to the TiO$_2$ layer. The cerium oxide and/or hydrated cerium oxide and/or cerium hydroxide layer is preferably applied by separate precipitation, i.e. not in coprecipitation, so that the cerium oxide and/or hydrated cerium oxide and/or cerium hydroxide layer is preferably substantially free of other metal oxides.

Preferably, the cerium-containing layer of cerium oxide and/or hydrated cerium oxide and/or cerium hydroxide is a discrete layer, which does not form a mixed layer with the underlying layer, for example a metal oxide layer such as a titanium oxide layer.

In addition, it is preferred to apply the $SiO_2$ layer directly to the cerium oxide and/or hydrated cerium oxide and/or cerium hydroxide layer. Most preferably, the $SiO_2$ layer is applied from a predominantly organic solvent mixture using sol-gel techniques, as explained below. It is furthermore preferred that the $SiO_2$ layer is also a discrete layer, which does not form a mixed layer with the underlying cerium-containing layer of cerium oxide and/or hydrated cerium oxide and/or cerium hydroxide.

The pigments of the invention consequently preferably have a protective layer system consisting of a cerium oxide and/or hydrated cerium oxide and/or cerium hydroxide layer, directly followed by an $SiO_2$ layer, to which the aforementioned surface modification by means of at least one α-silane with at least one functional binding group Y is applied. This protective layer system is preferably applied directly to a $TiO_2$ layer.

The subsequent $SiO_2$ layer, i.e. the second protective layer, forms in any case a further barrier. It protects the pearlescent pigment surface from infiltrating water and conversely bars free radical species that have possibly passed through the cerium oxide and/or hydrated cerium oxide and/or cerium hydroxide layer.

Moreover, the silicate layer can also presumably have a stabilizing action on account of its electronic nature. It is thought that the energetic level of the edges of the band of $SiO_2$ in comparison with those of $TiO_2$ is so stable that the transfer, in particular of electron holes but also of electrons which result after absorption of UV photons in the semiconductor $TiO_2$, is effectively suppressed at the interface of the pigment ("diode effect").

A further embodiment of the invention consists in that the platelet-shaped substrate has one or more metal oxide layers, preferably a layer of tin oxide. The layer of tin oxide can be applied as described, for example, in Examples 1 and 5 of DE 3535818 A1, which is included herein by reference. This layer is preferably applied during the preparation process of the substrate and then calcined.

Tin oxide is used in the preparation of pearlescent pigments in order to induce a rutile system in a $TiO_2$ layer, which is precipitated on the substrate, preferably mica platelets. $TiO_2$ grows on mica in an anatase system, which is undesirable on account of its higher photoactivity. Precoating the substrate with $SnO_2$, however, induces a rutile modification of the subsequent $TiO_2$ layer, as both oxides have a similar crystalline structure.

It has now been found, surprisingly, that an additional coating containing $SnO_2$ following a $TiO_2$ coating, i.e. prior to the application of the first protective layer consisting of or comprising cerium oxide and/or hydrated cerium oxide and/or cerium hydroxide and the application of the second protective layer of $SiO_2$, also increases the weather stability. The $SnO_2$ layer here is preferably applied directly to the $TiO_2$ layer.

In other embodiments of the invention, further layers, particularly metal oxide layers, can be disposed between the first protective layer consisting of or comprising cerium oxide and/or hydrated cerium oxide and/or cerium hydroxide and the second protective layer of $SiO_2$. These metal oxides are preferably $ZrO_2$.

In a further preferred embodiment, the first protective layer consists of cerium oxide and/or hydrated cerium oxide and/or cerium hydroxide and the second protective layer consists of $SiO_2$.

Pearlescent pigments which can be employed are all customarily commercially available pigments, such as, for example, those mentioned below.

The pearlescent pigments contain a platelet-shaped substrate, which is preferably selected from the group consisting of mica, talc, sericite, kaolin and $SiO_2$, glass, graphite, $Al_2O_3$ platelets and mixtures thereof. Preferred substrates here are natural or synthetic micas, $SiO_2$, glass, or $Al_2O_3$ platelets.

Preferred substrates are $SiO_2$, glass, or $Al_2O_3$ platelets, whose standard deviation of the thickness distribution is lower than 20%, more preferably lower than 15% and very preferably lower than 10%. These substrates have particularly smooth surfaces. Particularly color-intense pearlescent pigments with strong color flops can therefore be prepared using these substrates.

Glass platelets are particularly preferred in this case, as these are the easiest to prepare. Very preferably, the mean thickness of the glass platelets is less than 500 nm and even more preferably less than 350 nm. Such thin glass platelets are particularly suitable for automobile applications, since the layer thicknesses of the basecoat layers are very low in such cases (12 μm to 15 μm) and the trend is toward even smaller layer thicknesses. Such thin substrates are the prerequisite for relatively thin pearlescent pigments, which can only be optimally orientated in such thin pigmented coating systems. Optimally orientated pigments also provide optimal optical properties such as, for example, luster and color flop.

Further, preferably highly refractive layers are deposited on this poorly refractive platelet-shaped substrate. Such layers are preferably selected from the group consisting of metal chalcogenides, in particular metal oxides, metal hydroxides, hydrated metal oxides, metal suboxides and metal sulfides, metal fluorides, metal nitrides, metal carbides, and mixtures thereof.

Preferably, the substrates of the pearlescent pigments are coated with a multilayer system comprising or composed of metal oxide, metal hydroxide, metal suboxide and/or hydrated metal oxide, the order of the layers being variable. The metal oxides, metal hydroxides, metal suboxides and/or hydrated metal oxides can also be present side-by-side in the same layer.

Preferably, the substrates of the pearlescent pigments are coated with one or more metal oxide layers from the group consisting of or including $TiO_2$, $Fe_2O_3$, $Fe_3O_4$, $TiFe_2O_5$, ZnO, $SnO_2$, CoO, $Co_3O_4$, $ZrO_2$, $Cr_2O_3$ $VO_2$, $V_2O_3$, $(Sn,Sb)O_2$, and mixtures thereof. $TiO_2$ and/or $Fe_2O_3$ are particularly preferred.

$TiO_2$ in the rutile modification is particularly preferred.

In a further embodiment, the multilayer layer system has a layer order in which at least one highly refractive layer and at least one poorly refractive layer are disposed on a substrate in an alternating manner.

In the alternating configuration, it is also possible to have one or more highly refractive layers on top of each other and subsequently one or more poorly refractive layers on top of each other. It is essential, however, that highly refractive and poorly refractive layers are present in the layer system.

It is preferred that the multilayer system has a layer order in which at least one highly refractive layer, at least one poorly refractive layer and at least one highly reacting layer are disposed successively on a substrate.

In this variant too, one or more poorly or highly refractive layers can in each case be disposed on top of each other. It is essential, however, that highly refractive and poorly refractive and again highly refractive layers are present in that order as regarded from the inside to the outside of the layer system.

Preferably, the at least one highly refractive layer contains or consists of metal oxide and/or metal hydroxide selected from the group consisting of $TiO_2$, $Fe_2O_3$, $Fe_3O_4$, $TiFe_2O_5$, $ZnO$, $SnO_2$, $CoO$, $Co_3O_4$, $ZrO_2$, $Cr_2O_3$, $VO_2$, $V_2O_3$, $(Sn,Sb)O_2$, and mixtures thereof. The poorly refractive layer contains or preferably consists of metal oxide and/or metal hydroxide selected from the group consisting of $SiO_2$, $Al_2O_3$, $B_2O_3$ and mixtures thereof.

Pearlescent pigments which contain highly and poorly refractive layers afford particularly intense interference colors. In particular, pearlescent pigments having a highly refractive layer and a poorly refractive layer and again a highly refractive layer are particularly preferred. A layer order containing or consisting of $TiO_2/SiO_2/TiO_2$ and optionally additionally a layer containing $Fe_2O_3$ can afford intense gold shades and is particularly preferred.

In a further embodiment, the pearlescent pigments consist of glass platelets as substrates, these being coated on both sides with semitransparent metal layers. The metals of the semitransparent metal layers are preferably selected from the group consisting of silver, aluminum, chromium, nickel, gold, platinum, palladium, copper, zinc, and mixtures and alloys thereof. The thicknesses of the semitransparent layers preferably range from about 2 nm to about 30 nm, more preferably from about 5 nm to about 20 nm.

The metal oxide-containing platelet-shaped substrates provided with the protective topcoat of the invention preferably used are the following substrates:

$TiO_2$-coated and/or iron oxide-coated mica platelets,
$TiO_2$-coated and/or iron oxide-coated glass platelets,
$TiO_2$-coated and/or iron oxide-coated alumina platelets,
$TiO_2$-coated and/or iron oxide-coated $SiO_2$ platelets,
bismuth oxychloride platelets,
pure $TiO_2$ platelets,
and mixtures of all these substrates.

The refractive index of the metal oxide layer required to afford a good pearlescent effect, is greater than 1.8, preferably greater than 2.2, more preferably greater than 2.3, even more preferably greater than 2.4, and very preferably 2.5 or greater.

Preferably, in the present invention substrates coated with $TiO_2$ are provided with the protective layer described above. Mica pigments coated with $TiO_2$ and/or iron oxide are commercially available, for example, under the name PHOENIX® (Eckart). $Al_2O_3$ flakes coated with $TiO_2$ and/or $Fe_2O_3$ are supplied by Merck under the trade name Xirallic® and correspondingly coated $SiO_2$ flakes under the trade name Colorstream®. Glass flakes coated with $TiO_2$ and/or iron oxide are supplied, for example, by Engelhard, USA under the name Firemist® or by Merck, Darmstadt under the name MIRAVAL®. Multilayer interference pigments, such as are described, for example, in DE 19618569, consisting of a carrier coated with alternating layers of metal oxides of low and high refractive index, can be aftercoated according to the invention.

The aforementioned pigments can be very well stabilized against the photocatalytic activity induced by UV light with a first protective layer consisting of or containing cerium oxide and/or hydrated cerium oxide and/or cerium hydroxide and then with a second protective layer of $SiO_2$ and a subsequent organochemical aftercoat.

The process of the invention for the preparation of the pearlescent pigments of the invention comprises the following steps:

(a) suspending metal oxide-containing, platelet-shaped substrate in a liquid phase, the metal oxide having a refractive index greater than 1.8,
(b) applying a layer containing cerium oxide and/or hydrated cerium oxide and/or cerium hydroxide to the platelet-shaped substrate,
(c) optionally applying one or more metal oxide layers to the pigment coated in step (b),
(d) applying a layer consisting substantially, preferably entirely, of $SiO_2$ to the pigment coated in step (b) or step (c),
(e) coating the pigment obtained in step d) with an organochemical aftercoat comprising at least one α-silane of the formula (III)

$$X_{(4-n-m)}Si(\!-\!R^1)_m(\!-\!CH_2\!-\!Y)_n \qquad (III)$$

In which $1 \leq n+m \leq 3$; $m=0\text{-}2$; $n=1$ to 3 and
$R^1$ is a hydrogen atom or a Si—C-bonded $C_1$-$C_{20}$-hydrocarbon radical or a $C_1$-$C_{15}$-hydrocarbonoxy radical, in which in each case one or more methylene units not adjacent to one another may be replaced by the groups —O—, —CO—, —COO—, —OCO—, or —OCOO—, —S—, or —NR$^x$— and in which one or more methine units not adjacent to one another may be replaced by the groups —N—, —N═N—, or P═, wherein $R^1$ can independently be the same or different, and
$R^x$ can be a hydrogen atom or a linear, branched and/or cyclic $C_1$-$C_{15}$-hydrocarbon or aryl radical, and
X is a hydrolyzable and/or condensable group selected from the group consisting of alkoxy, hydroxy, acetyloxy, halogen, and mixtures thereof, and
Y is a functional binding group reactive with a binder system or a polymer component.

Y, $R^1$ and $R^x$ have the same meanings as indicated above for formula (I).

The group X, on account of its hydrolyzable and/or condensable properties, makes possible the formation of at least one —O—Si— bond to the substrate. Preferably, these groups are alkoxy groups, more preferably methoxy groups and very preferably ethoxy groups. The ethoxy group has the advantage that it releases only toxicologically acceptable ethanol.

Since the hydrolysis rates are generally markedly increased in the case of α-silanes, the ethoxides also react at a satisfactory rate compared with the methoxides. When using γ-silanes, however, on account of the greater sluggishness of the ethoxides, frequently the toxic methanol-releasing methoxides are used.

In the process of the invention, the pigment can be separated from the solvent after step (e) and optionally dried. Furthermore, a size classifying operation can be carried out, if appropriate.

In a preferred process variant, step (e) comprises organochemical aftercoating of at least one further γ-silane of the formula (IV)

$$X_{(4-n-m)}Si(\!-\!R^2)_m(\!-\!CH_2\!-\!CH_2\!-\!CH_2\!-\!Y)_n. \qquad (IV)$$

In a further process variant of the invention, the at least one α-silane of the formula $X_{(4-n-m)}Si(R)_m(CH_2\!-\!Y)_n$ is a monomer.

According to a further process variant, the at least one α-silane of the formula $X_{(4-n-m)}Si(R)_m(\!-\!CH_2\!-\!Y)_n$ is a silane which is prehydrolyzed to an extent of not more than 50% and is preferably a silane which is not prehydrolyzed.

In a further process variant, the at least one γ-silane of the formula $X_{(4-n-m)}Si(\!-\!R^2)_m(\!-\!CH_2\!-\!CH_2\!-\!CH_2\!-\!Y)_n$ is a silane which is prehydrolyzed to an extent of not more than 50% and is preferably a silane which is not prehydrolyzed.

The precipitation of the cerium hydroxide layer preferably takes place at reaction temperatures ranging from room temperature to the boiling temperature of the solvent and optionally in the presence of a catalyst. The protons released during the deposition reaction can be neutralized or partially neutralized by the addition of a base, before the deposition of silicate, preferably $SiO_2$, is started. The base can be metered in at the same time as the cerium reagent or added after the introduction of the cerium salt solution. It has been shown, surprisingly, that the precipitation of the cerium reagents employed takes place almost entirely, preferably entirely, in a pH range from 3 to 8, preferably from 4 to 7, such that in the subsequent addition of preferably tetraalkoxysilanes and precipitation of $SiO_2$ an almost pure, preferably pure, $SiO_2$ layer is applied.

According to the invention, the application of the cerium-containing layer and of the $SiO_2$ layer takes place sequentially, such that layers which are separate and discrete from one another are preferably formed.

The $SiO_2$ layer is preferably applied by a sol-gel process in a predominantly organic solvent mixture. In step (d), the $SiO_2$ layer is applied using preferably tetraalkoxysilanes and the optional addition of water. Such sol-gel processes, which are carried out in a predominantly organic solvent mixture, have advantages over the $SiO_2$ depositions described in the prior art, which start from aqueous silicate solutions. Modern binder systems are very sensitive to the presence of salts. These disrupt, for example, the colloidal stability of binder particles and can thus cause uncontrolled coagulation of the binder system of a paint system, which thus becomes unusable. Moreover, water-soluble constituents such as salts promote osmotic processes in pigmented coating systems, such that bubble formation and de-adhesion problems can occur due to accumulation of water in the resulting coating. Laborious purification steps are superfluous in a salt-free to low-salt preparation process of a pearlescent pigment. That is to say, the pigments of the invention have, after suspension thereof, lower conductivities than usual.

Alcohols result as the predominant reaction by-product, and these, together with the alcoholic solvent, can be worked up and recycled, for example by distillation.

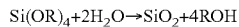

$$Si(OR)_4 + 2H_2O \rightarrow SiO_2 + 4ROH$$

According to a preferred development of the invention, the alkoxy group of the tetraalkoxysilane corresponds, after hydrolysis thereof, to the organic solvent used. On hydrolysis of the tetraalkoxysilane, release of the corresponding alcohol occurs, for example methanol, ethanol or propanol if R is $CH_3$, $C_2H_5$ or $C_3H_7$. When using methanol, ethanol or propanol as organic solvents, consequently no mixture of different solvents results from the hydrolysis, which in process technological terms is a very great advantage as regards working up or recycling the solvent.

A further advantage lies in the use of a monomeric starting substance for the preparation of the $SiO_2$ layer. In the sol-gel process in organic solvents, the reaction begins with the hydrolysis of the tetraalkoxysilane, i.e. a molecular monomer. Aqueous silicate solutions such as waterglass, however, are always already present in an oligomeric form of precondensed —O—Si—O— units. The hydrolysis step and the subsequent condensation can therefore be better controlled in the sol-gel process preferably used according to the invention. This has an advantageous effect on the quality and morphology of the layer formed. Presumably, the controlled deposition of the $SiO_2$ in the sol-gel process in the predominantly organic solvent mixture is also responsible for the high quality of the layer and the very good barrier effect obtained as a result.

Tetraalkoxysilanes are preferably used as starting compounds for the $SiO_2$ layer. Examples of these are: tetramethoxysilanes, tetraethoxysilanes, tetrapropoxysilanes, tetraisopropoxysilanes, tetrabutoxysilanes, or mixtures thereof.

The catalysis of the sol-gel process for the $SiO_2$ deposition preferably takes place in basic medium. Nitrogen-containing bases are preferably used as catalysts. Examples of these are ammonia, hydrazine, methylamine, ethylamine, triethanolamine, dimethylamine, diethylamine, methylethylamine, trimethylamine, triethylamine, ethylenediamine, trimethylenediamine, tetramethylenediamine, 1-propylamine, 2-propylamine, 1-butylamine, 2-butylamine, 1-propylmethylamine, 2-propylmethylamine, 1-butylmethylamine, 2-butylmethylamine, 1-propylethylamine, 2-propylethylamine, 1-butylethylamine, 2-butylethylamine, piperazine and pyridine.

These bases are also suitable for neutralization of the protons which may have been released during cerium hydroxide deposition.

$HNO_3$ or HCl, for example, is suitable for the neutralization of basic constituents which may have been released during the deposition of cerium hydroxide.

In a preferred variant of the process of the invention, the liquid phase in step (a) is a predominantly organic solvent mixture. Furthermore, the entire coating (b) to (e) of the pearlescent pigment is preferably carried out in a predominantly organic solvent mixture or in a liquid phase with a predominant proportion of organic solvent. A predominantly organic solvent mixture is understood here as meaning one which preferably contains less than 50% by weight of water.

Organic solvents used are, for example, ethers, esters, alcohols, ketones, aldehydes, or white spirit.

Preferably, the predominantly organic solvent mixtures used are alcoholic solvents comprising a proportion of alcohol of from 50% to 99%, by weight. Preferably, the proportion of alcohol is from 60% to 95%, by weight and more preferably from 70% to 90%, by weight. Below a proportion of alcohol of 50% by weight, the application properties of the coated pearlescent pigments can be impaired. This may cause, for example, a loss of luster in a coating. Above 99% by weight, the reaction mixture finally obviously contains too little water, which leads to a delayed hydrolysis of the alkoxysilanes, whereby the reaction time becomes excessively long.

Possible alcohols themselves are, for example, methanol, ethanol, n-propanol, isopropanol, n-butanol, 2-methylpropanol, 2-methoxypropanol, butyl glycol, etc. Mixtures of these alcohols in any desired ratios are also possible.

The remaining proportion of the mixture is composed of the reactant water plus any other organic solvents.

The advantage in the use of predominantly organic solvents, in particular in step (e), resides in the very good solubility of many silanes, in particular α-silanes, in organic solvents. For this reason, in addition to hydrophilic silanes, in particular also hydrophobic silanes can be used for the surface modification. Many silanes, however, are not soluble in aqueous solutions. This is remedied by a controlled prehydrolysis of the silanes [U.S. Pat. No. 5,759,255] or the synthesis of special water-soluble oligomer systems [DE 196 39 783]. Prehydrolyzed silanes systems, however, are not very stable to storage. Due to further hydrolysis or condensation processes, the silanes can continue to crosslink, and may oligomerize and finally become unusable for the purpose of surface modification. Water-soluble oligomer systems finally have to be synthesized, which is a laborious procedure, and they are likewise more difficult to store and are restricted in the choice of possibilities of varying the organofunctional groups. Using the process of the invention, the relatively expensive silanes are used economically.

Although aminosilanes, however, are generally soluble in water, they are hydrolyzed autocatalytically and condense to give oligomeric and polymeric systems. They therefore have only restricted storage stability in water.

Owing to the greater number of silanes available as surface-modifying agents, the surface properties of the pearlescent pigments of the invention can be adapted to the various pigmented coating systems in a variety of ways.

The steps (a) to (e) of the process described are preferably carried out in the same liquid medium. In this embodiment, for step (c), cerium salts adequately soluble in predominantly organic solvents are used. Preferred examples of these are cerium(III) acetate, cerium(III) octoate, cerium(III) acetylacetonate, cerium(III) nitrate, cerium(III) chloride, and cerium (IV) ammonium nitrate.

The preferred variant of the process of the invention described here is distinguished by a one-pot process, in which organochemical aftercoating takes place immediately following coating with cerium oxide/hydroxide and subsequently $SiO_2$. The silanes are added directly to the reaction solution, i.e. without prehydrolysis, hydrolyze in situ and finally condense with hydroxyl groups of the $SiO_2$ layer, such that a covalent bond to the pigment surface is formed. This affords extremely simple process management with, at the same time a very good choice of usable silanes.

In a further variant of the process of the invention, after application of the cerium oxide and/or hydrated cerium oxide and/or cerium hydroxide coat from aqueous solution, the $SiO_2$ coating can also take place in aqueous medium from silicate solutions. The conditions for the deposition of cerium or silicate compounds from aqueous solution are described, for example, in Example 2, lines 30 to 37 of EP 0 141 174 or in Example 1 of EP 649 886 B1 and also in Example 1 of DE 4207723 or in Example 1 of DE 2106613, which are incorporated herein by reference. Subsequently, a calcination step can optionally be carried out. The conditions necessary for this are known per se to the person skilled in the art and can be taken, for example, from DE 2106613 or DE 3535818.

A further variant of the process of the invention for the preparation of the pigments of the invention comprising a further metal oxide layer on the substrate consists in applying this layer during the process for the preparation of the substrate and subsequently calcining, if appropriate. The details for this are known to the person skilled in the art and can be taken, for example, from DE 2106613 or DE 3535818.

A further process for the preparation of the pigments of the invention comprising a further metal oxide layer between the layer of cerium oxide and/or cerium hydroxide and the $SiO_2$ layer consists in the precipitation of this metal oxide layer after the application of the cerium oxide/cerium hydroxide layer. The precipitation of this metal oxide layer can take place either in a predominantly organic solvent mixture or in an aqueous solution.

The pearlescent pigments of the invention are preferably used in pigmented coating systems, powder-based pigmented coating systems, printing inks, plastics and other coatings.

In particular, the coated pearlescent pigments of the invention are used as weather-resistant pearlescent pigments in automobile lacquers and also in powder-based pigmented coating systems and coatings for external applications.

The following examples are intended to illustrate the invention in more detail without restricting it thereto.

EXAMPLES

Example 1

100 g of commercially available, blue pearlescent pigment based on $TiO_2$-coated mica of a fineness (pigment diameter) of from 10 µm to 40 µm (PHOENIX PX 1261, Eckart) were suspended in 300 ml of ethanol and brought to the boil. First 20 g of water and subsequently, during the course of one hour, a solution of 2.2 g of $Ce(NO_3)_3 \times 6H_2O$ in 10 g of water were added with stirring. Subsequently, a solution of 2.0 g of ammonia (25% strength by weight) in 8.0 g of water was added. 10.6 g of tetraethoxysilane and 25 g of ethanol were then introduced continuously over a period of 2 h using a metering pump (Ismatec). Subsequently, the suspension was left to react for an additional 6 h. 0.6 g of Geniosil XL 926 and 0.4 g of Dynasylan AMEO were then added and the mixture was allowed to cool slowly. It was stirred overnight at room temperature and the solid was filtered off the next day. The pigment filter cake was subsequently dried at 80° C. overnight in vacuo.

The product had a theoretical cerium content of 0.7% by weight and an $SiO_2$ content of 3.0% by weight.

Example 2

Example 1 was repeated except that 100 g of a silver-white pearlescent pigment of a fineness of from 10 µm to 40 µm (PHOENIX PX 1001, Eckart) were used.

Example 3

Example 1 was repeated except that 0.6 g of Geniosil XL 924 was used instead of Geniosil XL 926.

Example

Example 2 was repeated except that 0.6 g of Geniosil XL 924 was used instead of Geniosil XL 926.

Example 5

100 g of commercially available, blue pearlescent pigment based on $TiO_2$-coated mica of a fineness of from 10 µm to 40 µm (PHOENIX PX 1261, Eckart) were suspended in 900 g of water. Subsequently, a solution of 2.30 g of $SnCl_4 \times 5H_2O$ in 45 ml of dilute hydrochloric acid was metered in at a rate of 2 ml/min, the pH being kept constant by simultaneous dropwise addition of 20% strength sodium hydroxide solution. After stirring for 30 min, the solid was filtered off, washed with water, and dried at 120° C.

The dry, coated pigment was suspended in 300 ml of ethanol and brought to the boil. First 20 g of water and subsequently, during the course of one hour, a solution of 2.2 g of $Ce(NO_3)_3 \times 6H_2O$ in 10 g of water was added with stirring. Then, a solution of 2.0 g of ammonia (25% strength by weight) in 8.0 g of water was added. 10.6 g of tetraethoxysilane and 25 g of ethanol were then introduced continuously over a period of 2 h using a metering pump (Ismatec). Subsequently, the suspension was allowed to react for an additional 6 h. 0.6 g of Geniosil XL 926 and 0.4 g of Dynasylan AMEO were then added, and the mixture was allowed to cool slowly. It was stirred overnight at room temperature and the solid was filtered off the next day. The pigment filter cake was subsequently dried at 80° C. overnight in vacuo.

The pigment had a theoretical $SnO_2$ content of 1.0%, a cerium content of 0.7% and an $SiO_2$ content of 4.2% by weight.

Comparative Example 1

Commercially available Exterior CFS Mearlin Super Blue 6303Z (10 µm to 40 µm) supplied by Engelhard, Iselin, N.J.

Comparative Example 2

Commercially available Iriodin 9225 SW (10 µm to 40 µm) supplied by Merck, Darmstadt.

Comparative Example 3

Commercially available Exterior CFS Mearlin Bright Silver 1303Z (10 µm to 40 µm) supplied by Engelhard, Iselin, N.J.

Comparative Example 4

Commercially available Iriodin 9103 SW (10 µm to 40 µm) supplied by Merck, Darmstadt.

Comparative Example 5

Example 1 was repeated, except that no α-silane was added. The agent added for surface modification consisted of only 0.4 g of Dynasylan AMEO.

The pigments of the examples relating to the invention and the comparative examples were subjected to various tests for weather stability and for UV stability. The test methods are described below and the results listed.

A Condensation Water Climate Test

A number of pigment samples were incorporated in a water-based paint system and the test applications were produced by spray-coating. The basecoat was overcoated with a commercial one-component clearcoat and then baked. These applications were tested as specified in DIN 50 017 (standard damp heat atmosphere). The adhesive strength was tested by means of cross cutting as specified in DIN EN ISO 2409 immediately on conclusion of the test and one hour later and compared with the unstressed sample. In this test, Gt 0 denotes "no change" and Gt 5 "very severe change". The degree of swell was assessed visually immediately following condensation stress, using a method based on DIN 53 230. Here, the index 0 denotes "no change" and the index 5 denotes "very severe change". The degree of bubble formation was assessed visually as specified in DIN 53 209. Here again, the score ranges from 0 ("very good") to 5 ("very poor"). "m" denotes the frequency and "g" the size of the bubbles. Finally, the DOI (distinctness of image) was assessed visually. This may vary substantially on account of swelling caused by water retention (0=very good, 5=very poor).

TABLE 1

Condensation water climate and cross cutting tests

| Sample | Cross cutting | | | Degree of bubble formation | Degree of swell | DOI | |
|---|---|---|---|---|---|---|---|
| | 0 sample | 0 h | 1 h | | | 0 h | 1 h |
| Example 1 | 0 | 0 | 0 | m1/g1 | 0 | 0 | 0 |
| Example 2 | 0 | 0 | 0 | m1/g1 | 0 | 0 | 0 |
| Example 3 | 0 | 0-1 | 0 | m1/g1 | 0 | 0 | 0 |

TABLE 1-continued

Condensation water climate and cross cutting tests

| Sample | Cross cutting | | | Degree of bubble formation | Degree of swell | DOI | |
|---|---|---|---|---|---|---|---|
| | 0 sample | 0 h | 1 h | | | 0 h | 1 h |
| Example 4 | 0 | 0 | 0 | m1/g1 | 1 | 0 | 0 |
| Example 5 | 0 | 0-1 | 0 | m1/g1 | 1 | 1 | 0 |
| Comp. Example 1 | 0 | 0 | 0 | m2/g1 | 1-2 | 0 | 0 |
| Comp. Ex. 2 | 0 | 0 | 0 | m3/g1 | 2 | 1 | 0 |
| Comp. Ex. 3 | 0 | 1 | 0 | m1/g1 | 2 | 2 | 0 |
| Comp. Ex. 4 | 0 | 0 | 0 | m3/g1 | 2 | 1 | 0 |
| Comp. Ex. 5 | 0 | 0 | 0 | m3/g1 | 3 | 3 | 2 |

As the results show, the pigments of Examples 1 to 5 of the invention are comparable to those of the Comparative Examples 1-5 representing the prior art as regards the condensation water climate test and these likewise pass excellently. Unlike the pigments of the comparative examples, the degree of bubble formation and the degree of swell are lower and the DOI is better than in the prior art. An aftercoat consisting only of a functional aminosilane such as AMEO has, after being stressed with condensation water, however, clear disadvantages in terms of degree of swell, degree of bubble formation and distinctness of image.

B WOM Test

The pigment samples were incorporated in a water-based paint system and the test applications were produced by spray-coating. The basecoat was overcoated with a commercial clearcoat and then baked. The accelerated weathering test took place as specified in SAE-J 1960 in an Atlas Ci-65 A Xeno-test apparatus having a water-cooled 6.5 kW xenon radiator. The determination of the $\Delta E^*$ indices and also the gray scale rating took place in each case relative to the corresponding unstressed sample.

C UV Stability in Drawdowns

This test was carried out analogously to the UV test described in EP 0870730 for determining the photochemical UV activity of $TiO_2$ pigments.

For this purpose, 1.0 g of the pearlescent pigment was dispersed in 9.0 g of a melamine-containing paint rich in double bonds. Drawdowns were prepared on cardboard-backed paper, and were dried at room temperature. The drawdowns were cut in two and in each case one of the two sections was stored in the dark as an unstressed sample for comparison purposes. Subsequently, the samples were irradiated with UV-containing light (UV-A-340 lamp, irradiation level 1.0 W/m²/nm) in a QUV apparatus supplied by Q-Panel for 150 minutes. Immediately on conclusion of the test, calorimetric values of the stressed test samples relative to the respective control sample were determined using a Minolta CM-508i calorimeter. The resultant $\Delta E^*$ indices, calculated according to the Hunter $L^*a^*b^*$ formula, are listed in Tab. 2.

In the test, a substantially gray-blue discoloration of the $TiO_2$ layer of the pearlescent pigment is observed in the drawdowns, owing to Ti(III) centers being formed under the influence of UV light. The condition for this to occur is that the electron hole has departed from the $TiO_2$ and—as a result of, say, reaction with olefinic double bonds in the binder—is unable to immediately recombine with the remaining electron. Since a melamine-containing paint layer significantly slows down the diffusion of water (vapor) and oxygen to the pigment surface, reoxidation of the titanium(III) centers takes place in a distinctly retarded fashion, so that the degree of graying can be measured and the $\Delta E^*$ index can be employed as a measure of the light stability of the pigments. Thus the higher the numerical value of the ΔE* index for the stressed sample relative to the unstressed control sample, the poorer the light stability of the pigment under investigation.

The results of the WOM test and of the UV doctor blade test with the pigments of the examples of the invention and of the comparative examples are summarized in Table 2.

TABLE 2

WOM and UV drawdown test results

| Sample | WOM test ΔE* | WOM test Grayscale | UV test ΔE* (no OSM) | UV test ΔE* (with OSM) |
|---|---|---|---|---|
| Example 1 | | | 1.1 | 1.2 |
| 500 h | 0.1 | 5 | | |
| 1000 h | 0.2 | 5 | | |
| 2000 h | 0.2 | 5 | | |
| 3000 h | 0.3 | 5 | | |
| 4000 h | 0.3 | 4-5 | | |
| Example 2 | | | 0.7 | 0.8 |
| 500 h | 0.2 | 5 | | |
| 1000 h | 0.2 | 5 | | |
| 2000 h | 0.2 | 5 | | |
| 3000 h | 0.2 | 5 | | |
| 4000 h | 0.2 | 5 | | |
| Example 3 | | | 1.3 | 1.1 |
| 500 h | 0.1 | 5 | | |
| 1000 h | 0.2 | 5 | | |
| 2000 h | 0.2 | 5 | | |
| 3000 h | 0.3 | 5 | | |
| 4000 h | 0.3 | 4-5 | | |
| Example 4 | | | 0.9 | 0.8 |
| 500 h | 0.2 | 5 | | |
| 1000 h | 0.2 | 5 | | |
| 2000 h | 0.2 | 5 | | |
| 3000 h | 0.2 | 5 | | |
| 4000 h | 0.2 | 5 | | |
| Comp. Example 1 (Exterior CFS Mearlin Super Blue 6303Z) | | | — | 2.3 +/− 0.3 |
| 500 h | 0.4 | 5 | | |
| 1000 h | 0.5 | 5 | | |
| 2000 h | 0.8 | 4-5 | | |
| 3000 h | 0.8 | 4-5 | | |
| 4000 h | 1.0 | 4 | | |
| Comp. Example 2 | | | — | 12.1 |
| Comp. Example 3 | | | | 2.1 |
| Comp. Example 4 | | | | 8.5 |

OSM: surface modification

If the color changes ΔE* of the WOM test of the blue pigments of Examples 1 to 4 of the invention are compared with the comparative examples representing the prior art (Tab. 2), lower values and therefore better weather resistances are obtained. Moreover, lower degrees of graying are observed in the examples relating to the invention. The UV light resistances especially, which are determined with the aid of the drawdown test, are clearly better.

The pearlescent pigments of the invention are therefore able to improve the weather and UV stability with an optimal layer order of first cerium oxide/hydroxide and subsequently $SiO_2$ and an organochemical aftercoat comprising α-silane, as compared with the pigments of the comparative examples representing the prior art.

UV Resistance:

For closer investigation of the architecture of the oxide layer and of the influence of the $SiO_2$ layer thickness, further examples of the invention and comparative examples were prepared and investigated with respect to their UV resistance in the drawdown test. An organochemical aftercoat was dispensed with here in order only to investigate the mode of action of the oxidic protective layers.

Examples 6 and 7

100 g of commercially available, blue pearlescent pigment based on $TiO_2$-coated mica of a fineness of from 10 μm to 40 μm (PHOENIX PX 1261, Eckart) were suspended in 300 ml of isopropanol and brought to the boil. First 2.0 g of $H_2O$ and subsequently a solution of 0.93 g of $Ce(NO_3)_3 \times 6H_2O$ in 8 g of isopropanol were added during the course of one hour with stirring. Subsequently, a solution of 0.45 g of ethylenediamine in 3.0 g of $H_2O$ was added. Afterwards, a certain amount of tetraethoxysilane (see Table 3) and 22 g of isopropanol were continuously introduced over a period of 2 h using a metering pump (Ismatec). Subsequently, the suspension was allowed to react for an additional 6 h. The mixture was stirred overnight at room temperature and suction filtered the next day. The pigment filter cake was subsequently dried at 100° C. in vacuo for 6 h.

Various amounts of $SiO_2$ were deposited in a similar manner (see Table 3).

Comparative Examples 6 and 7

For comparison, various protective layers with a varying $SiO_2$ content were also prepared, without cerium salts being additionally deposited.

Comparative Example 8

Likewise, a comparative example comprising a cerium-containing protective layer (0.3% Ce content) was prepared, without $SiO_2$ being additionally deposited.

Comparative Example 9 and 10 (Mixed Layer)

100 g of commercially available, blue pearlescent pigment based on $TiO_2$-coated mica of a fineness of from 10 μm to 40 μm (PHOENIX PX 1261, Eckart) were suspended in 300 ml of isopropanol and brought to the boil. First 2.0 g of $H_2O$ and subsequently a solution of 0.45 g of ethylenediamine in 3.0 g of $H_2O$ were added with stirring. Afterwards, a solution of tetraethoxysilane (see Table 3) in 100 g of isopropanol and a solution of 0.93 g of $Ce(NO_3)_3 \times 6H_2O$ in 100 g of isopropanol were continuously simultaneously introduced over a period of 2 h using a metering pump (Ismatec). Subsequently, the suspension was allowed to react for an additional 6 h. The mixture was stirred at room temperature overnight and suction filtered the next day. The pigment filter cake was subsequently dried in vacuo at 80° C.

Various amounts of $SiO_2$ were deposited in a similar manner (see Table 3).

Comparative Examples 11 and 12

Comparative Examples 11 and 12 were prepared following the coating method described for Examples 6 and 7, first the silicate compound and then the cerium salts being introduced and precipitated in this case.

The ΔE* indices of all examples of the UV resistance test described above were determined on drawdowns. The amounts of chemicals employed, theoretical protective layer components contents and the ΔE* indices are shown in Table 3.

TABLE 3

UV drawdown test results

| Sample | Layer 1 | Layer 2 | Amount of tetraethoxysilane used | ΔE* |
|---|---|---|---|---|
| Example 6 | 0.3% Ce | 1% SiO$_2$ | 3.47 g | 1.5 |
| Example 7 | 0.3% Ce | 2% SiO$_2$ | 6.94 g | 1.0 |
| Comparative Example 6 | — | 1% SiO$_2$ | 3.47 g | 5.8 |
| Comparative Example 7 | — | 2% SiO$_2$ | 6.94 g | 3.1 |
| Comparative Example 8 | 0.3% Ce | — | — | 8.4 |
| Comparative Example 9 | 0.3% Ce/ 1% SiO$_2$ | — | 3.47 g | 3.1 |
| Comparative Example 10 | 0.3% Ce/ 2% SiO$_2$ | — | 6.94 g | 2.3 |
| Comparative Example 11 | 1% SiO$_2$ | 0.3% Ce | 3.47 g | 6.0 |
| Comparative Example 12 | 2% SiO$_2$ | 0.3% Ce | 6.94 g | 3.3 |

It can clearly be seen from Tab. 3 that a layer order of firstly cerium oxide and/or hydrated cerium oxide and/or cerium hydroxide and secondly SiO$_2$ affords the best UV resistance. Comparatively much lower resistances are obtained with pearlescent pigments protected only with SiO$_2$ and pearlescent pigments protected only with cerium oxide and/or hydrated cerium oxide and/or cerium hydroxide or pearlescent pigments in which the layer order is first SiO$_2$, and then cerium oxide and/or hydrated cerium oxide and/or cerium hydroxide. Likewise, mixed layers of SiO$_2$ and cerium oxide and/or hydrated cerium oxide and/or cerium hydroxide have a lower stabilizing effect. These findings are a clear indication of the synergistic effects of a combined, successively precipitated cerium hydroxide and SiO$_2$ coats, which only become effective if first the cerium oxide and/or hydrated cerium oxide and/or cerium hydroxide layer and then the silica layer is precipitated.

Subsequently, the luster properties of PHOENIX PX 1261 and PHOENIX PX 1001 pearlescent pigments coated with a cerium oxide layer and a SiO$_2$ layer according to Examples 1 and 2 were compared with non-aftercoated PHOENIX PX 1261 or PX 1001 pearlescent pigments, respectively To this end, the pearlescent pigments comprising a layer of cerium oxide and a layer of SiO$_2$ (see Examples 1 and 2) and those not having an organochemical aftercoat were introduced into a customary commercial NC lacquer system at a pigmentation level of 6% by weight, based on the total weight of the lacquer. Drawdowns having a wet film thickness of 36 μm were prepared from the pigmented NC lacquer systems. The drawdowns were applied to test cards having a black and white surface, supplied by BYK-Gardner, Germany, and then dried for 30 minutes at 25° C.

The luster measurements were carried out using a micro-TRI-Gloss μ-apparatus supplied by BYK-Gardner according to manufacturer's instructions at a measuring geometry of 600 relative to the vertical. A measuring geometry of 60° is suitable for the so-called "medium gloss" ranging from 10 to 70 gloss points, a higher numerical value of said gloss points being indicative of a higher luster. The measured results are given in Table 4.

TABLE 4

Luster values of PHOENIX PX 1261 with (Example 1) and without SiO$_2$ coating

| Sample | 60° luster on white background | 60° luster on black background |
|---|---|---|
| PHOENIX PX 1261 with cerium oxide and SiO$_2$ coats (Ex. 1) | 36.7 (0.3) | 33.6 (0.2) |
| PHOENIX PX 1261 without aftercoating | 34.7 (0.1) | 31.4 (0.5) |

TABLE 5

Luster values of PHOENIX PX 1001 with (Example 2) and without SiO$_2$ coating

| Sample | 60° luster on white background | 60° luster on black background |
|---|---|---|
| PHOENIX PX 1001 with cerium oxide and SiO$_2$ coats (Ex. 2) | 63.9 (0.2) | 60.8 (0.2) |
| PHOENIX PX 1001 without aftercoating | 60.2 (0.2) | 57.5 (0.3) |

It can be seen from Tables 4 and 5 that coating pearlescent pigments with a layer of cerium oxide and a layer of SiO$_2$ having a low refractive index surprisingly leads to a better luster than the pearlescent pigments with no protective layer. In view of the low refractive index of SiO$_2$, it would have been expected that the pearlescent pigments coated with SiO$_2$ would have had much lower luster properties.

What is claimed is:

1. A pearlescent pigment comprising a metal oxide-containing, platelet-shaped substrate and with a first and a second protective layer, wherein the metal oxide has a refractive index greater than 1.8, wherein a) the first protective layer comprises at least one metal oxide selected from the group consisting of cerium oxide, hydrated cerium oxide, cerium hydroxide and mixtures thereof, b) the second protective layer is comprised substantially of SiO$_2$, wherein the second protective layer is disposed on top of the first protective layer, and between the first and second protective layers there are optionally disposed at least one metal oxide layer composed of a metal oxide that differs from the metal oxide contained in both the first protective layer and the second protective layer, wherein c) the second protective layer has an organochemical aftercoat and the organochemical aftercoat comprises at least one α-silane bonded to the second protective layer by means of at least one oxygen atom, said α-silane having the formula

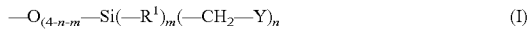

$$—O_{(4-n-m)}—Si(—R^1)_m(—CH_2—Y)_n \qquad (I)$$

in which $1 \leq n+m \leq 3$; m=0 to 2; n=1 to 3 and $R^1$ is a hydrogen atom or an Si—C-bonded $C_1$-$C_{20}$-hydrocarbon radical or a $C_1$-$C_{15}$-hydrocarbonoxy radical, in which in each case one or more methylene units not adjacent to one another can be replaced by the groups —O—, —CO—, —COO—, —OCO—, or —OCOO—, —S—, or —NR$^x$ and in which one or more methine units not adjacent to one another can be replaced by the groups —N=, —N=N—, or —P=, wherein $R^1$ can independently be the same or different, $R^x$ can be a hydrogen atom or a linear, branched and/or cyclic $C_1$-$C_{15}$-hydrocarbon radical or aryl radical, and Y is a functional binding group reactive with a binder system, and wherein the organochemical aftercoat comprises no silane not having a functional binding group.

2. The pearlescent pigment as defined in claim 1, wherein the Si—C-bonded $C_1$-$C_{20}$-hydrocarbon radical $R^1$ is substituted by at least one functional binding group reactive with a binder system, which reactive functional binding group is selected from the group consisting of —CN, —NCO, —NR$^x_2$, —COOH, —COOR$^x$, -acryloyl, -methacryloyl, -epoxy, epoxyglycohexyl, ureido, —SH, —OH, —CONR$^x_2$, and mixtures thereof, and wherein m does not equal 0.

3. The pearlescent pigment as defined in claim 2, wherein $R^x$ is selected from the group consisting of a hydrogen atom and at least one of a linear, branched and cyclic $C_1$-$C_{15}$-hydrocarbon or aryl radical, wherein $R^x$ can independently be the same or different, and wherein m does not equal 0.

4. The pearlescent pigment as defined in claim 1, wherein the functional binding group Y reactive with a binder system is selected from the group consisting of —CN, —NCO, —NR$^x_2$, —CHNR$^x_2$, CH$_2$—NR$^x$, morpholino, —COON, —COOR$^x$, —OC(O)C(R)=CH$_2$, -epoxy, epoxyglycohexyl, ureido, —C(O)—NH—C(O)—NR$^x_2$, —SH, or —OH, and mixtures thereof.

5. The pearlescent pigment as defined in claim 4, wherein the functional binding group Y is glycidoxy.

6. The pearlescent pigment as defined in claim 1, wherein n=1 and m=1.

7. The pearlescent pigment as defined in claim 1, wherein the radical $R^1$ is an unsubstituted $C_1$-$C_3$ hydrocarbon radical, and wherein m does not equal 0.

8. The pearlescent pigment as defined in claim 4, wherein the radical $R^1$ is a methyl group, and wherein m does not equal 0.

9. The pearlescent pigment as defined in claim 1, wherein n=1 and m=0.

10. The pearlescent pigment as defined in claim 1, wherein the organochemical aftercoat comprises one or more α-silanes of the formula

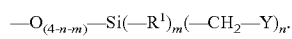

11. The pearlescent pigment as defined in claim 1, wherein the organochemical aftercoat additionally comprises at least one γ-silane of formula (II)

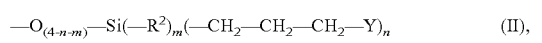         (II), in which 1≦n+m≦3; m=0 to 2; n=1 to 3 and $R^2$ is a hydrogen atom or an Si—C-bonded $C_1$-$C_{20}$-hydrocarbon radical or a $C_1$-$C_{15}$-hydrocarbonoxy radical, in which in each case one or more methylene units not adjacent to one another can be replaced by the groups —O—, —CO—, —COO—, —OCO—, or —OCOO—, —S—, or —NR$^x$- and in which one or more methine units not adjacent to one another can be replaced by the groups —N—, —N=N—, or P=, in which $R^2$ can independently be the same or different, $R^x$ is a hydrogen atom or at least one of a linear, branched and cyclic $C_1$-$C_{15}$-hydrocarbon or aryl radical, $R^x$ can be the same or different, and Y is a binding group functional with a binder system.

12. The pearlescent pigment as defined in claim 11, wherein the Si—C-bonded $C_1$-$C_{20}$-hydrocarbon radical $R^2$ is substituted by at least one functional binding group reactive with a binder system, said reactive functional binding group being selected from the group consisting of —CN, —NCO, —NR$^x_2$, —COOH, —COOR$^x$, -acryloyl, -methacryloyl, -epoxy, —SH, —OH, ureido, —CONR$^x_2$, and mixtures thereof, and wherein m does not equal 0.

13. The pearlescent pigment as defined in claim 11, wherein the functional binding group Y reactive with a binder system is selected from the group consisting of acrylate groups, methacrylate groups, vinyl groups, amino groups, γ-(2-aminoethyl)amino groups, cyanate groups, isocyanate groups, epoxy groups, hydroxyl groups, thiol groups, ureido groups, and carboxyl groups, and mixtures thereof.

14. The pearlescent pigment as defined in claim 1, wherein the organochemical aftercoat comprises one or more α-silanes of the formula

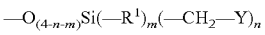

and one or more γ-silanes of the formula

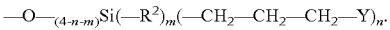

15. The pearlescent pigment as defined in claim 1, wherein the organochemical aftercoat comprises no alkylsilane.

16. The pearlescent pigment as defined in claim 1, wherein the proportion of the organochemical aftercoat is between 0.1% and 6%, by weight, based on the total weight of the pigment.

17. The pearlescent pigment as defined in claim 16, wherein the proportion of the organochemical overcoat is between 0.2 and 5% by weight, based upon the total weight of the pigment.

18. The pearlescent pigment as defined in claim 1, wherein the first protective layer, in addition to a metal oxide selected from the group consisting of cerium oxide, hydrated cerium oxide, cerium hydroxide and mixtures thereof, also contains SiO$_2$.

19. The pearlescent pigment as defined in claim 1, wherein at least one further layer is disposed between the first protective layer and the second protective layer.

20. The pearlescent pigment as defined in claim 19, wherein said at least one further layer is a metal oxide layer.

21. The pearlescent pigment as defined in claim 1, wherein the platelet-shaped substrate has one or more metal oxide layers.

22. The pearlescent pigment as defined in claim 21, wherein said metal oxide layers are tin oxide layers.

23. The pearlescent pigment as defined in claim 21, wherein the substrate coated with the one or more metal oxide layers is calcined.

24. The pearlescent pigment as defined in claim 1, wherein
a) the first protective layer consists of at least one metal oxide selected from the group consisting of cerium oxide, hydrated cerium oxide and cerium hydroxide, and
b) the second protective layer consists of $SiO_2$.

25. The pearlescent pigment as defined in claim 1, wherein
the $SiO_2$ content of the pigment is from 0.5% to 8%, by weight, based on the total weight of the pigment.

26. The pearlescent pigment as defined in claim 1, wherein
the cerium content is from 0.5% to 3.0%, by weight, based on the total weight of the pigment.

27. The pearlescent pigment as defined in claim 26, wherein the cerium content is from 0.1 to 1.0% by weight, based on the total weight of the pigment.

28. The pearlescent pigment as defined in claim 1, wherein
the platelet-shaped substrate is selected from the group consisting of
at least one of $TiO_2$-coated and iron oxide-coated mica platelets,
at least one of $TiO_2$-coated and iron oxide-coated glass platelets,
at least one of $TiO_2$-coated and iron oxide-coated alumina platelets,
at least one of $TiO_2$-coated and iron oxide-coated $SiO_2$ platelets,
bismuth oxychloride platelets,
pure $TiO_2$ platelets,
and mixtures thereof.

29. The pearlescent pigment as defined in claim 28, wherein
the platelet-shaped substrate is a glass platelet coated with at least one of $TiO_2$ and iron oxide, the mean thickness of the glass platelet being less than 500 nm.

30. The pearlescent pigment as defined in claim 29, wherein the mean thickness of the glass platelet is less than 350 nm.

31. The pearlescent pigment as defined in claim 1, wherein
the substrate comprises a layer of $TiO_2$.

* * * * *